April 22, 1958   N. R. RICHMOND   2,831,493
FLUID SYSTEM WITH PRESSURE HALVING VALVE
Filed Feb. 3, 1953

INVENTOR
NELSON R. RICHMOND
BY Leonard F. Wetelink
ATTORNEY

United States Patent Office 2,831,493
Patented Apr. 22, 1958

2,831,493
FLUID SYSTEM WITH PRESSURE HALVING VALVE

Nelson R. Richmond, Thompsonville, Conn., assignor to United Aircraft Corporation, East Hartford, Conn., a corporation of Delaware Application February 3, 1953, Serial No. 334,941

2 Claims. (Cl. 137—116.5)

This invention relates to fluid systems and more particularly to controls for fluid motors.

In propellers or similar mechanism where fluid motors are utilized to vary the pitch of the blades, it is the usual practice to control reversible pitch changing fluid motors by governor pilot valves which are double acting. In other words, the pilot valve connects one side of the fluid motor with pressure and the other side simultaneously to drain. The connections are vise verse for movement of the fluid motor in an opposite direction. It has been found that by utilizing double acting pilot valves the valve land spacing becomes very critical and results in unstable governor constant speed operation. It has also been found that due to leakage inherent in fluid motors as compared to the closely fitted parts of the control valve, small pilot valve displacements do not provide sufficiently high pressures which are required to start the motor under load.

It is therefore an object of this invention to provide a simple fluid system including a fluid motor and accurate controls therefor.

It is another object of this invention to provide a fluid system having a fluid motor which can be controlled for movement in any of two directions by a single acting pilot valve.

It is a further object of this invention to provide a fluid system having a fluid motor and a pressure halving valve controlled by a single acting pilot valve so that momentary high pressures are caused to exist across the fluid motor by small pressure differences across the pilot valve.

It is a further object of this invention to provide a fluid system of the type described including a pressure halving valve therefor.

These and other objects will become readily apparent from the following detail description of the drawings in which.

Figure 1:
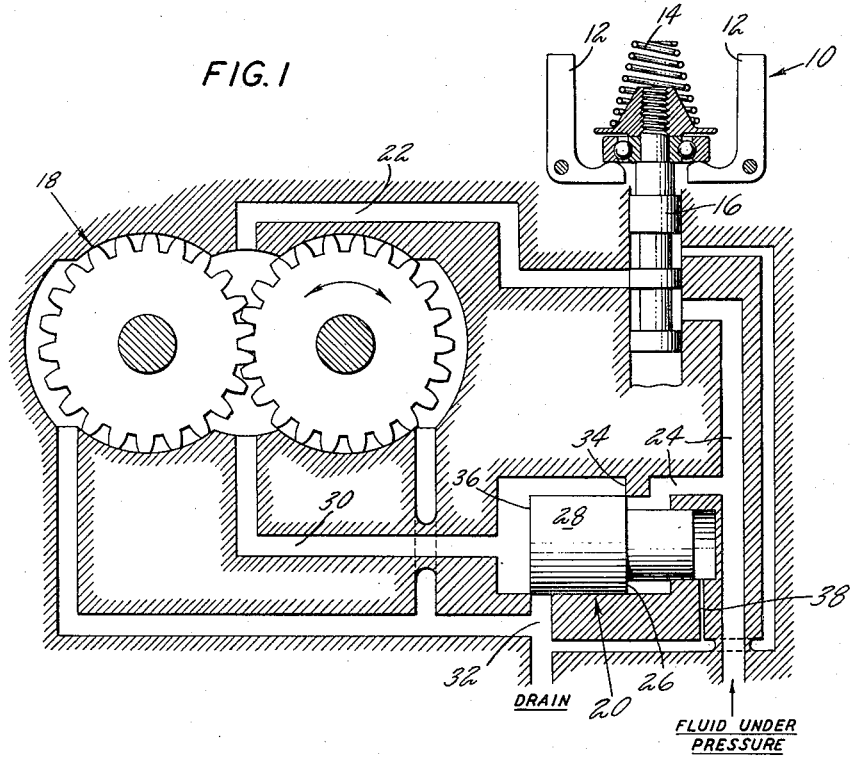
Fig. 1 is a diagrammatical illustration in partial cross section of the fluid system of this invention.

Referring to Fig. 1, a governor 10 is illustrated as having flyweights 12 and a spring 14 which biases the flyweights 12 in one direction. The flyweights 12 engage and operate a pilot valve 16 which is adapted to control the direction of motion of a reversible gear type motor 18 and included in this system is a pressure halving valve 20. As is apparent from the drawing, overspeed conditions will cause the pilot valve 16 to be raised while during underspeed position the pilot valve will be lowered. These movements of the pilot valve will connect passage 22 to either pressure or drain.

The pressure halving valve 20 has a passage 24 which connects the valve 20 with a source of high pressure fluid. The pressure of the fluid may be in the order of 500 p. s. i. The high pressure thus acts on the face 26 of the piston 28 to urge the piston 28 toward the left which will tend to bleed a portion of the fluid past the land 34. The opposite end of the piston 28 has a passage 30 leading thereto which communicates with one side of the gear motor 18. Also, a passage 32 is provided adjacent the left-hand side of the piston 28 and provides communication with drain.

As previously stated, high pressure acting on the face 26 of the piston 28 urges the piston toward the left until the face 26 passes the land or shoulder 34 and provides a path for fluid under pressure to act on the opposing face 36 of the piston 28. It is preferred that the piston face 36 have twice the area of the face 26 so that the pressure acting on the face 36 will move the piston 28 back to the right until the pressure drop caused by the fluid flowing past the shoulder 34 reduces the pressure on face 36 to half the value of that acting on face 26. As a result the pressure in passage 30 will be half of that maintained in passage 24 and also in passage 22 when the latter is connected to pressure. The pressure in passage 30, which for example would be 250 p. s. i., constantly urges the gear motor 18 to rotate in one direction so that in order to maintain the gear motor motionless, as for example for constant speed operation in a propeller installation, the pilot valve 16 bleeds sufficient pressure to the line 22 so that it balances the pressure in passage 30 and the pressure drop across the pilot valve equals the pressure drop across land 34.

Thus, it can be seen that by movement of the pilot valve 16 in one direction, high pressure fluid can be directed to the line 22 which will overcome the pressure in the line 30 so as to move the gear motor in one direction. On the other hand, movement of the pilot valve 16 in another direction will connect the line 22 with drain so that the pressure in the passage 30 will cause the fluid motor to rotate in the other direction. Drain passage 32 is opened by the piston 28 when it is moved to the right by pressure acting on the face 36 to permit the flow of fluid into passage 32 so as to insure that the pressure in line 30 is maintained at half of that occurring in line 24 when full operating pressure is being directed into passage 22.

As seen in Fig. 1, a restrictor passage 38 connects to drain, to damp the movements of the piston 28 thereby preventing chatter of the piston.

Figure 2:
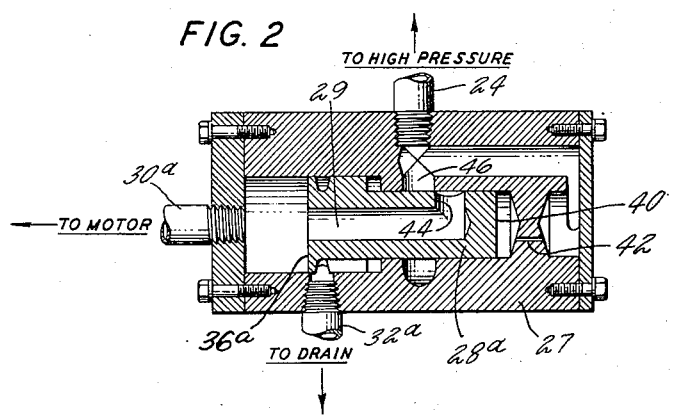
Fig. 2 is a detail cross-sectional view of a modified halving valve for the system.

Fig. 2 illustrates a modified type of pressure halving valve and comprises a valve body 27 which has a piston 28a slidable therein, the piston 28a having two portions of different dimension each of which portions are slidable in separate corresponding bores. The piston 28a includes a hollow portion 29 to provide communication to the larger face 36a of the piston. As illustrated herein, high pressure is supplied to the face 40 of the piston 28a via a restricted passage 42 so that the pressure halving effect is obtained by positioning of the shoulder 44 with respect to the port 46. Thus fluid under pressure enters through line 24 and is bled through the hollow portion 29 of the piston 28a and pressure thus acts on the larger face 36a of the piston. Passages 30a and 32a correspond to passages 30 and 32 in Fig. 1.

The restricted passage 42 tends to provide damping for the valve motion, however, under certain conditions it may not be necessarily provided.

As a result of this invention it is apparent that a simplified yet accurate fluid motor control system has been provided which avoids all the disadvantages of double acting control systems.

Although only certain embodiments of this invention have been illustrated and described herein, it will be apparent that various changes and modifications may be made in the construction and arrangement of the various parts without departing from the scope of this novel concept.

What it is desired to obtain by Letters Patent is:

1. In a valve, a valve casing, a movable valve element slidable in two directions in the casing, said element comprising two portions having opposing faces of different areas, the portion having the face of larger area being in sealing contact with said casing, an inlet in said casing communicating with the smaller of said areas, a port communicating with said inlet and located adjacent said smaller area, said port being adapted to be opened by movement of said element in one direction to provide communication with the larger of said areas, an outlet in said casing in continuous communication with the larger of said areas, and a vent in said casing adjacent said larger area and communicating therewith upon movement of said valve element in the other direction.

2. In a valve, a valve casing having two bores of different dimensions, a unitary valve element having two portions of different dimensions slidable in said bores respectively, the larger of said portions comprising a piston slidable in the larger of said bores and in sealing contact with the sidewall of said casing thereby preventing leakage, an inlet in said casing, a bleed passage in an end wall of the smaller of said bores communicating with said inlet to conduct fluid to the end area of the smaller of said portions, a port in the side wall of said bore communicating with said inlet, a passage in said valve element providing fluid communication between said port and the larger of said bores whereby the fluid acts against the end area of the larger of said portions, said port communicating with said passage upon movement of said valve element in a given direction, an outlet in the end wall of the larger of said bores, and a second outlet in the side wall of the larger of said bores and adapted to be uncovered upon movement of said valve element in one direction.

References Cited in the file of this patent

UNITED STATES PATENTS

| | | |
|---|---|---|
| 1,186,780 | Hennebohle | June 13, 1916 |
| 1,249,736 | Frink | Dec. 11, 1917 |
| 1,581,454 | Larson | Apr. 20, 1926 |
| 1,766,510 | Gregory | June 24, 1930 |
| 1,985,443 | Clute | Dec. 25, 1934 |
| 2,063,414 | Tweddell | Dec. 8, 1936 |
| 2,133,170 | Johnson | Oct. 11, 1938 |
| 2,411,930 | Mathys | Dec. 3, 1946 |
| 2,598,180 | Kenyon | May 27, 1952 |

FOREIGN PATENTS

| | | |
|---|---|---|
| 813,156 | Germany | Sept. 10, 1951 |

U. S. DEPARTMENT OF COMMERCE
PATENT OFFICE

CERTIFICATE OF CORRECTION

Patent No. 2,831,493     Nelson R. Richmond     April 22, 1958

It is hereby certified that error appears in the printed specification of the above numbered patent requiring correction and that the said Letters Patent should read as corrected below.

Column 3, line 11, after "areas," insert -- said valve element being adapted to be moved solely by the pressures acting on said areas, --; column 4, line 6, after "direction" insert -- whereby only the pressures acting on said valve portions of different dimensions position said valve --; column 4, line 7, strike out "and" --; line 10, after "direction" insert -- , and a source of relatively low pressure communicating with said second outlet --.

Signed and sealed this 17th day of June 1958.

(SEAL)
Attest:

KARL H. AXLINE
Attesting Officer

ROBERT C. WATSON
Commissioner of Patents